United States Patent
Nakada et al.

(10) Patent No.: US 8,835,061 B2
(45) Date of Patent: Sep. 16, 2014

(54) METAL OXYGEN BATTERY

(75) Inventors: Satoshi Nakada, Saitama (JP); Yuji Isogai, Saitama (JP); Kiyoshi Tanaami, Saitama (JP); Takuya Taniuchi, Saitama (JP); Taichi Goto, Oita (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/541,715

(22) Filed: Jul. 4, 2012

(65) Prior Publication Data
US 2013/0164616 A1    Jun. 27, 2013

(30) Foreign Application Priority Data

Jul. 6, 2011  (JP) ................................ 2011-150281
Jul. 3, 2012  (JP) ................................ 2012-149235

(51) Int. Cl.
*H01M 4/36* (2006.01)
*H01M 4/131* (2010.01)
*H01M 12/08* (2006.01)
*H01M 4/62* (2006.01)
*H01M 4/50* (2010.01)

(52) U.S. Cl.
CPC ............... *H01M 4/131* (2013.01); *H01M 4/36* (2013.01); *H01M 12/08* (2013.01); *Y02E 60/128* (2013.01); *H01M 4/62* (2013.01); *H01M 4/502* (2013.01)
USPC ........... 429/405; 429/402; 429/403; 429/407; 429/212

(58) Field of Classification Search
CPC ... H01M 12/04; H01M 12/06; H01M 12/065; H01M 12/08
USPC .............. 429/402–407, 231.95, 231.9, 218.1, 429/224, 185, 174, 163, 212
See application file for complete search history.

(56) References Cited

U.S. PATENT DOCUMENTS 7,696,126 B2    4/2010 Isogai et al.
2002/0142203 A1*  10/2002 Ma et al. ..................... 429/27

(Continued)

FOREIGN PATENT DOCUMENTS

JP    2000-044245 A    2/2000
JP    2005-166685 A    6/2005

(Continued)

OTHER PUBLICATIONS

Debart, A.; Bao, J.; Armstrong, G., and Bruce, P.G., "An O2 cathode for rechargeable lithium batteries: The effect of a catalyst," Journal of Power Sources, Jun. 30, 2007, pp. 1177-1182, vol. 174, Elsevier B.V.

(Continued)

*Primary Examiner* — Milton I Cano
*Assistant Examiner* — Jimmy K Vo
(74) *Attorney, Agent, or Firm* — Capitol City TechLaw, PLLC

(57) ABSTRACT

There is provided a metal oxygen battery which uses an oxygen-storing material containing $YMnO_3$ as a positive electrode material, and can reduce the discharge overpotential. The metal oxygen battery 1 has a positive electrode 2 to which oxygen is applied as an active substance, a negative electrode 3 to which metallic lithium is applied as an active substance, and an electrolyte layer 4 interposed between the positive electrode 2 and the negative electrode 3. The positive electrode 2 contains, as an oxygen-storing material, a composite metal oxide obtained by crushing and mixing a yttrium salt, a manganese salt and an organic acid, primarily calcining the mixture, and thereafter, adding a zirconium salt to the obtained primarily calcined material, and secondarily calcining the mixture, the composite metal oxide containing $YMnO_3$ and $ZrO_2$.

5 Claims, 4 Drawing Sheets

(56) References Cited

U.S. PATENT DOCUMENTS

| | | | |
|---|---|---|---|
| 2002/0155335 A1* | 10/2002 | Kearl | 429/30 |
| 2011/0111230 A1 | 5/2011 | Kinoshita et al. | |
| 2011/0195320 A1 | 8/2011 | Nishikoori et al. | |
| 2012/0129058 A1* | 5/2012 | Litzinger et al. | 429/403 |
| 2013/0011754 A1 | 1/2013 | Tanaami et al. | |

FOREIGN PATENT DOCUMENTS

| | | |
|---|---|---|
| JP | 2006-040822 A | 2/2006 |
| JP | 2007-216099 A | 8/2007 |
| JP | 2007-307446 A | 11/2007 |
| JP | 2008-1112724 A | 5/2008 |
| JP | 2009-230985 A | 10/2009 |
| JP | 2010-161059 A | 7/2010 |
| WO | 2010/082338 A1 | 7/2010 |
| WO | WO2010082338 * | 7/2010 |
| WO | 2010/0131536 A1 | 11/2010 |
| WO | 2011/115176 A1 | 9/2011 |

OTHER PUBLICATIONS

Atsumi, T.; Ohgushi, T., and Kamegashira, N., "Studies on oxygen dissociation pressure of LnMnO3 (Ln= rare earth) with the e.m.f. technique," Journal of Alloys and Compounds, May 1996, pp. 35-40, vol. 238, Elsevier Science S.A.

German Patent Office, Search report dated Apr. 4, 2013, issued in counterpart German application No. 10 2012 211 745.8, in German.

German Patent Office, Office Action dated Apr. 4, 2013, issued in counterpart German application No. 10 2012 211 745.8, English translation.

* cited by examiner

METAL OXYGEN BATTERY

BACKGROUND OF THE INVENTION

1. Field of the Invention

The present invention relates to a metal oxygen battery.

2. Description of the Related Art

Metal oxygen batteries have conventionally been known, which have a positive electrode using oxygen as an active substance, a negative electrode using a metal as an active substance, and an electrolyte layer interposed between the positive electrode and the negative electrode.

In the metal oxygen batteries, in the discharge time, a metal is oxidized to form metal ions at the negative electrode, and the formed metal ions permeate through the electrolyte layer and migrate into the positive electrode side. On the other hand, at the positive electrode, oxygen is reduced to form oxygen ions, and the formed oxygen ions bond with the metal ions to form a metal oxide.

In the charge time, at the positive electrode, metal ions and oxygen ions are formed from the metal oxide, and the formed oxygen ions are oxidized to become oxygen. On the other hand, the metal ions permeate through the electrolyte layer and migrate into the negative electrode side, and reduced to become the metal at the negative electrode.

In the metal oxygen battery, if metallic lithium is used as the metal, since the metallic lithium has a high theoretical potential and a large electrochemical equivalent weight, the metal oxygen battery can provide a large capacity. If oxygen in the air is used as the oxygen, since there is no need for filling a positive electrode active substance in a battery, the energy density per mass of the battery can be raised.

However, if the positive electrode is exposed to the atmosphere in order to make oxygen in the air to be a positive electrode active substance, moisture, carbon dioxide and the like in the air invade in the battery, and there is caused a problem of deterioration of the electrolyte, the negative electrode and the like. Then, in order to solve the problem, a metal oxygen battery is known, which has a positive electrode containing an oxygen-occluding material to release oxygen by reception of light, a negative electrode composed of metallic lithium, and an electrolyte layer disposed in a hermetically sealed case, and has a light transmission part to guide light to the oxygen-occluding material (for example, see Japanese Patent Laid-Open No. 2009-230985).

The metal oxygen battery can release oxygen from the oxygen-occluding material by guiding light to the oxygen-occluding material through the light transmission part, and can provide oxygen as a positive electrode active substance without exposing the positive electrode to the atmosphere. Therefore, the deterioration of the electrolyte, the negative electrode and the like due to the invasion of moisture, carbon dioxide and the like into the battery can be prevented.

However, in the conventional metal oxygen battery, the supply of oxygen becomes unstable in the absence of irradiation of light rays, and there is a risk that the light transmission part, which is weaker than other parts of the hermetically sealed case, is broken and the electrolyte solution leaks out. Then, it is conceivable that an oxygen-storing material which does not rely on irradiation of light rays and can occlude and release oxygen chemically, or adsorb and desorb oxygen physically is used as a positive electrode material of the metal oxygen battery. The oxygen-storing material includes $YMnO_3$.

However, in a metal oxygen battery using an oxygen-storing material composed of $YMnOO_3$ as the positive electrode material, the discharge overpotential becomes high, resulting in disadvantages that the charge and discharge efficiency decreases and a high power output cannot be attained.

SUMMARY OF THE INVENTION

It is an object of the present invention to eliminate such disadvantages and provide a metal oxygen battery which uses an oxygen-storing material comprising $YMnO_3$ as a positive electrode material and whose discharge overpotential can be decreased.

The present inventors have studied causes of the discharge overpotential becoming high when an oxygen-storing material comprising $YMnO_3$ is used as a positive electrode material of a metal oxygen battery. As a result, the present inventors have found that in the oxygen-storing material, when a raw material powder thereof is calcined at a temperature of about 1,000°, sintering of $YMnO_3$ particles together excessively progresses, and the particle diameter becomes large and the specific surface area becomes small.

The case where an oxygen-storing material composed of $YMnO_3$ occludes and releases oxygen in its crystal lattice usually involves the formation and the dissociation of a chemical bond with oxygen. However, in the case where the oxygen-storing material absorbs and desorbs oxygen on and from its surface, only an intermolecular force acts, and the formation and the dissociation of the chemical bond are not involved.

Therefore, the adsorption and the desorption of oxygen on and from the surface of the oxygen-storing material are carried out in lower energies than in the case where the oxygen-storing material occludes and releases oxygen, and in the battery reaction, oxygen adsorbed on the surface of the oxygen-storing material is preferentially used. Therefore, if the specific surface area of the oxygen-storing material is small, since the amount of oxygen which can be adsorbed and desorbed on and from the surface thereof decreases, and the reaction interface in which lithium ions react with oxygen ions decreases, the discharge overpotential of a metal oxygen battery conceivably becomes high.

The present invention has been achieved based on the finding; and in order to achieve the above-mentioned object, in a metal oxygen battery comprising a positive electrode to which oxygen as is applied an active substance, a negative electrode to which metallic lithium is applied as an active substance, and an electrolyte layer interposed between the positive electrode and the negative electrode, the positive electrode contains, as an oxygen-storing material, a composite metal oxide obtained by crushing and mixing a yttrium salt, a manganese salt and an organic acid, primarily calcining the mixture, and thereafter, adding a zirconium salt to the obtained primarily calcined material, and secondarily calcining the mixture, the composite metal oxide comprising $YMnO_3$ and $ZrO_2$.

In the metal oxygen battery according to the present invention, in the discharge, metallic lithium is oxidized to form lithium ions and electrons at the negative electrode as shown in the following formula, and the formed lithium ions permeate through the electrolyte layer and migrate into the positive electrode. On the other hand, at the positive electrode, oxygen released or desorbed from the oxygen-storing material is reduced to form oxygen ions, and the formed oxygen ions react with the lithium ions to form lithium oxide or lithium peroxide. Then, by connecting the negative electrode and the positive electrode by a lead wire, an electric energy can be taken out.

(Negative Electrode) 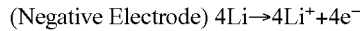
(Positive Electrode) 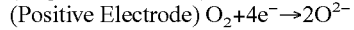

a. $4Li^+ + 2O^{2-} \rightarrow 2Li_2O$ b. $2Li^+ + 2O^{2-} \rightarrow Li_2O_2$ In the charge time, lithium ions and oxygen ions are formed from lithium oxide or lithium peroxide at the positive electrode as shown in the following formulae, and the formed lithium ions permeate through the electrolyte layer and migrate into the negative electrode. The formed oxygen ions are occluded or adsorbed as they are or as oxygen molecules formed by oxidation of the oxygen ions in or on the oxygen-storing material. At the negative electrode, the lithium ions are reduced and deposit as metallic lithium.

(Positive Electrode) $2Li_2O \rightarrow 4Li^+ + 2O^{2-}$ a. $Li_2O_2 \rightarrow 2Li^+ + 2O^{2-}$ (Negative Electrode) $4Li^+ + 4e^- \rightarrow 4Li$ Here, an oxygen-storing material in the metal oxygen battery according to the present invention can be obtained by crushing and mixing a yttrium salt, a manganese salt and an organic acid, primarily calcining the mixture, and thereafter, adding a zirconium salt to the obtained primarily calcined material, and secondarily calcining the mixture. If a part of the surface of the $YMnO_3$ particle is covered with $ZrO_2$ particles in secondary calcination, since the $ZrO_2$ particle has a hardly sintering property and a smaller particle diameter than the $YMnO_3$ particle, excessive sintering of $YMnO_3$ particles together is suppressed. Consequently, the oxygen-storing material containing the obtained composite metal oxide comprising $YMnO_3$ and $ZrO_2$ has a smaller particle diameter and a larger specific surface area than an oxygen-storing material manufactured with no zirconium salt added and composed only of $YMnO_3$.

Therefore, the amount of oxygen which can be adsorbed and desorbed on and from the surface of the oxygen-storing material increases, and the reaction interface in which lithium ions react with oxygen ions increases. In the metal oxygen battery according to the present invention, the discharge overpotential can consequently be decreased.

In the metal oxygen battery according to the present invention, the zirconium salt is added preferably in the range of 1 to 20% by mass with respect to the total amount of a primarily calcined material of the yttrium salt, the manganese salt and the organic acid.

If the amount of the zirconium salt added to the primarily calcined material is smaller than 1% by mass with respect to the total of the primarily calcined material, the effect of suppressing excessive sintering of $YMnO_3$ particles together cannot be attained sufficiently in secondary calcination in some cases.

By contrast, if the amount of the zirconium salt added to the primarily calcined material exceeds 20% by mass with respect to the total of the primarily calcined material, the surface of the $YMnO_3$ particle is covered excessively with the $ZrO_2$ particles. Consequently, the relative proportion of the $YMnO_3$ with respect to the whole surface area of the oxygen-storing material decreases, and the catalytic capability of the $YMnO_3$ is inhibited, and additionally, a sufficient oxygen storage capability cannot be attained in some cases.

Further since $ZrO_2$ is a solid acid, the $ZrO_2$ has a function of stabilizing the crystallinity of the $ZrO_2$ itself by adsorbing or storing inside oxygen ions released from $YMnO_3$. Then, if the amount of a zirconium salt added to the primarily calcined material exceeds 20% by mass with respect to the total of the primarily calcined material, the discharge capacity decreases in some cases. Further since the $ZrO_2$ is stabilized as a solid solution with $YMnO_3$ in secondary calcination, a decrease in the specific surface area and a decrease in the catalytic activity of the $YMnO_3$ are brought about, and the effect of suppressing a rise in the overpotential cannot be attained sufficiently in some cases.

In the metal oxygen battery according to the present invention, the positive electrode, the negative electrode and the electrolyte layer are preferably disposed in a hermetically sealed case. In the metal oxygen battery according to the present invention, since the oxygen-storing material can chemically occlude and release or physically adsorb and desorb oxygen, oxygen as an active substance can be obtained at the positive electrode disposed in the hermetically sealed case instead of exposing the positive electrode to the atmosphere and forming a weak light transmission part. Therefore, the deterioration by moisture and carbon dioxide in the atmosphere and the leakage of an electrolyte solution by damage to the light transmission part can be avoided.

DETAILED DESCRIPTION OF THE PREFERRED EMBODIMENTS

Then, embodiments according to the present invention will be described in more detail by reference to accompanying drawings.

Figure 1:
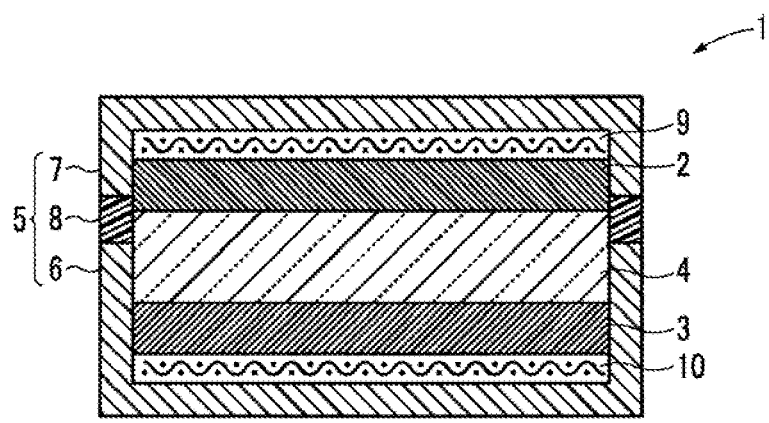
FIG. 1 is an illustrative cross-sectional diagram showing one constitution example of the metal oxygen battery according to the present invention.

As shown in FIG. 1, a metal oxygen battery 1 according to the present embodiment comprises a positive electrode 2 using oxygen as an active substance, a negative electrode 3 using metallic lithium as an active substance, and an electrolyte layer 4 disposed between the positive electrode 2 and the negative electrode 3, and the positive electrode 2, the negative electrode 3 and the electrolyte layer 4 are hermetically accommodated in a case 5.

The case 5 comprises a cup-shape case body 6, and a lid body 7 to close the case body 6, and an insulating resin 8 is interposed between the case body 6 and the lid body 7. The positive electrode 2 has a positive electrode current collector 9 between the top surface of the lid body 7 and the positive electrode 2, and a negative electrode 3 has a negative electrode current collector 10 between the bottom surface of the case body 6 and the negative electrode 3. Here, in the metal oxygen battery 1, the case body 6 acts as a negative electrode plate, and the lid body 7 acts as a positive electrode plate.

In the metal oxygen battery 1, the positive electrode 2 may comprise an oxygen-storing material, a conductive material and a binder. The oxygen-storing material can be obtained by the following steps.

First, for example, a yttrium salt, a manganese salt and an organic acid are crushed and mixed, and thereafter the mixture is primarily calcined at a temperature in the range of 250 to 350° C. for a time in the range of 0.5 to 1 hour. Then, the obtained primarily calcined material is crushed and mixed, and thereafter, a zirconium salt is added thereto in the range of 1 to 20% by mass of the total amount of the primarily calcined material, and secondarily calcined at 800° C. for 3 hours.

The yttrium salt, the manganese salt and the zirconium salt can include, for example, nitrate salts of respective metals. The organic acid can include, for example, malic acid.

The $ZrO_2$ particle formed by calcining of the zirconium salt has a hardly sintering property and a smaller particle diameter than that of the $YMnO_3$ particle. Then, a part of the surface of the $YMnO_3$ particle formed is covered with the $ZrO_2$ particles in the secondary calcination, and excessive sintering of $YMnO_3$ particles together is thereby suppressed.

Consequently, the oxygen-storing material obtained by the secondary calcination and comprising $YMnO_3$ and $ZrO_2$ has a smaller particle diameter and a larger specific surface area than an oxygen-storing material manufactured with no zirconium salt added and composed only of $YMnO_3$. A composite metal oxide as the oxygen-storing material thus obtained has a specific surface area, for example, in the range of 1 to 30 $cm^2/g$.

The conductive material includes, for example, carbon materials such as graphite, acetylene black, Ketjen Black, carbon nanotubes, mesoporous carbon and carbon fibers.

The binder includes polytetrafluoroethylene (PTFE), and polyvinylidene fluoride (PVDF).

Then, the electrolyte layer 4 may be, for example, one in which a nonaqueous electrolyte solution is immersed in a separator, or a solid electrolyte.

The nonaqueous electrolyte solution usable is, for example, one in which a lithium compound is dissolved in a nonaqueous solvent. The lithium compound includes, for example, carbonate salts, nitrate salts, acetate salts and lithium hexafluorophosphate ($LiPF_6$). The nonaqueous solvent includes, for example, carbonate esteric solvents, etheric solvents and ionic liquids.

The carbonate esteric solvent includes, for example, ethylene carbonate, propylene carbonate, dimethyl carbonate and diethyl carbonate. The carbonate esteric solvent may be used as a mixture of two or more.

The etheric solvent includes, for example, dimethoxyethane, dimethyltriglyme and polyethylene glycol. The etheric solvent may be used as a mixture of two or more.

The ionic liquid includes, for example, salts of cations such as imidazolium, ammonium, pyridinium and piperidinium, with anions such as bis(trifluoromethylsulfonyl)imide (TTSI), bis(pentafluoroethylsulfonyl)imide (BETI), tetrafluoroborates, perchlorates and halogen anions.

The separator includes, for example, glass fibers, glass papers, polypropylene nonwoven fabrics, polyimide nonwoven fabrics, polyphenylene sulfide nonwoven fabrics and polyethylene porous films.

The solid electrolyte includes, for example, oxide-based solid electrolytes and sulfide-based solid electrolytes.

The oxide-based solid electrolytes includes, for example, $Li_7La_3Zr_2O_{12}$, which is a composite oxide of lithium, lanthanum and zirconium, and glass ceramics containing lithium, aluminum, silicon, titanium, germanium and phosphorus as main components. The $Li_7La_3Zr_2O_{12}$ may be one in which another metal such as strontium, barium, silver, yttrium, lead, tin, antimony, hafnium, tantalum and niobium is substituted for a part of each of lithium, lanthanum and zirconium.

Then, the current collectors 9 and 10 includes ones composed of meshes of titanium, stainless steel, nickel, aluminum, copper or the like.

In the metal oxygen battery 1 according to the present embodiment, in the discharge time, metallic lithium is oxidized to form lithium ions and electrons at the negative electrode 3 as shown in the following formula. The formed lithium ions migrate into the positive electrode 2, and react with oxygen ions formed by reduction of oxygen supplied from the oxygen-storing material to form lithium oxide or lithium peroxide.

(Negative Electrode) $4Li \rightarrow 4Li^+ + 4e^-$
(Positive Electrode) $O_2 + 4e^- \rightarrow 2O^{2-}$ $$4Li^+ + 2O^{2-} \rightarrow 2Li_2O \qquad \text{a.}$$

$$2Li^+ + 2O^{2-} \rightarrow Li_2O_2 \qquad \text{b.}$$

On the other hand, in the charge time, lithium ions and oxygen ions are formed from lithium oxide or lithium peroxide at the positive electrode 2 as shown in the following formulae. The formed lithium ions migrate into the negative electrode 3 and are reduced at the negative electrode 3 to thereby deposit as metallic lithium.

(Positive Electrode) $2Li_2O \rightarrow 4Li^+ + 2O^{2-}$ $$Li_2O_2 \rightarrow 2Li^+ + 2O^{2-} \qquad \text{a.}$$

(Negative Electrode) $4Li^+ + 4e^- \rightarrow 4Li$

In the metal oxygen battery 1 according to the present embodiment, as described above, the oxygen-storing material has a larger specific surface area than an oxygen-storing material manufactured with no zirconium salt added and composed only of $YMnO_3$. Therefore, in the oxygen-storing material, the amount of oxygen which can be adsorbed and desorbed on and from the surface thereof increases, and the reaction interface in which lithium ions react with oxygen ions increases. In the metal oxygen battery 1 according to the present embodiment, the discharge overpotential can consequently be decreased.

Here, although in the oxygen-storing material in the discharge or the charge time described above, the occlusion and release of oxygen involves the formation and dissociation of a chemical bond, the adsorption and desorption of oxygen on and from the surface can be carried out only by an energy corresponding to an intermolecular force. Therefore, for the battery reaction at the positive electrode 2, oxygen adsorbed on and desorbed from the surface of the oxygen-storing material is preferentially used, allowing suppression of a decrease in the reaction rate and a rise in the overpotential.

Then, Examples and Comparative Examples are shown.

EXAMPLE 1

In the present Example, first, yttrium nitrate pentahydrate, manganese nitrate hexahydrate and malic acid in a molar ratio of 1:1:6 were crushed and mixed to thereby obtain a mixture of a composite metal oxide material. Then, the obtained mixture of the composite metal oxide material was reacted at a temperature of 250° C. for 30 min, and thereafter further reacted at a temperature of 300° C. for 30 min and at a temperature of 350° C. for 1 hour to perform primary calcination.

Then, the primarily calcined material obtained in the primary calcination was crushed and mixed, and thereafter, zirconium nitrate pentahydrate was added thereto so as to become 20% by mass of the total amount of the primarily calcined material, and secondarily calcined at a temperature of 800° C. for 3 hours to thereby obtain a composite metal oxide.

The composite metal oxide obtained was confirmed to be a composite metal oxide represented by the chemical formula $YMnO_3$ and have a hexagonal structure by an X-ray diffractometry pattern. The average particle diameter D50 of the composite metal oxide obtained in the present Example was calculated by using a laser diffraction/scattering type particle size distribution measuring apparatus (made by HORIBA Ltd.) and using ethanol as a solvent. The results are shown in Table 1. A graph of the particle size distribution of the composite metal oxide obtained in the present Example is shown in FIG. 2(a).

The specific surface area of the composite metal oxide was measured by the mercury intrusion method using a fully automatic pore distribution measuring apparatus (made by Quantachrome Corp.). The result is shown in Table 1.

Then, 500 mg of the composite metal oxide obtained in the present Example was accommodated in a quartz sample tube; and the sample tube was placed in a tubular furnace. An Ar gas containing 3% by volume of $H_2$ was introduced from the inlet side of the sample tube into the sample tube at a flow rate of 100 ml/min. Then, the $H_2$ gas concentration was measured at the outlet side of the sample tube, and the state was held until the $H_2$ gas concentration became constant.

Then, the tubular furnace was heated up to 700° C. at a rate of 10° C./min while the Ar gas containing $H_2$ was being introduced into the sample tube, and the $H_2O$ concentration in the gas released from the outlet side of the sample tube during the temperature rise was measured. Then, the amount of oxygen adsorbed of the composite metal oxide was calculated from the measured $H_2O$ concentration. The acquired result of the amount of oxygen adsorbed is shown as an oxygen release capability in FIG. 3.

Then, the composite metal oxide obtained in the present Example as an oxygen-storing material, Ketjen Black (made by Lion Corp.) as a conductive material, and a polytetrafluoroethylene (made by Daikin Industries, Ltd.) as a binder were mixed in a mass ratio of 40:50:10 to thereby obtain a positive electrode mixture. Then, the obtained positive electrode mixture was press bonded at a pressure of 5 MPa on a positive electrode current collector 9 composed of a titanium mesh to thereby form a positive electrode 2 of 15 mm in diameter and 1 mm in thickness.

The positive electrode 2 was measured for the porosity by the mercury intrusion method using a fully automatic pore distribution measuring apparatus (made by Quantachrome Corp.), and the measurement revealed that the positive electrode 2 had a porosity of 78% by volume.

Then, a negative electrode current collector 10 of 15 mm in diameter composed of a copper mesh was arranged inside a bottomed cylindrical SUS-made case body 6 of 15 mm in inner diameter, and a negative electrode 3 of 15 mm in diameter and 0.1 mm in thickness composed of metallic lithium was superposed on the negative electrode current collector 10.

Then, a separator of 15 mm in diameter composed of a glass fiber (made by Nippon Sheet Glass Co., Ltd.) was superposed on the negative electrode 3. Then, the positive electrode 2 and the positive electrode current collector 9 obtained as described above were superposed on the separator so that the positive electrode 2 contacted with the separator. Then, a nonaqueous electrolyte solution was injected in the separator to thereby form an electrolyte layer 4.

As the nonaqueous electrolyte solution used was a solution (made by Kishida Chemical Co., Ltd.) in which lithium hexafluorophosphate ($LiPF_6$) as a supporting salt was dissolved at a concentration of 1 mol/L in a mixed solvent prepared by mixing ethylene carbonate and diethyl carbonate in a mass ratio of 50:50.

Then, a laminate comprising the negative electrode current collector 10, the negative electrode 3, the electrolyte layer 4, the positive electrode 2, and the positive electrode current collector 9 accommodated in the case body 6 was closed by a bottomed cylindrical SUS-made lid body 7 of 15 mm in inner diameter. At this time, a ring-shape insulating resin 8 of 32 mm in outer diameter, 30 mm in inner diameter and 5 mm in thickness composed of a polytetrafluoroethylene (PTFE) was disposed between the case body 6 and the lid body 7 to thereby obtain a metal oxygen battery 1 shown in FIG. 1.

Figure 4:
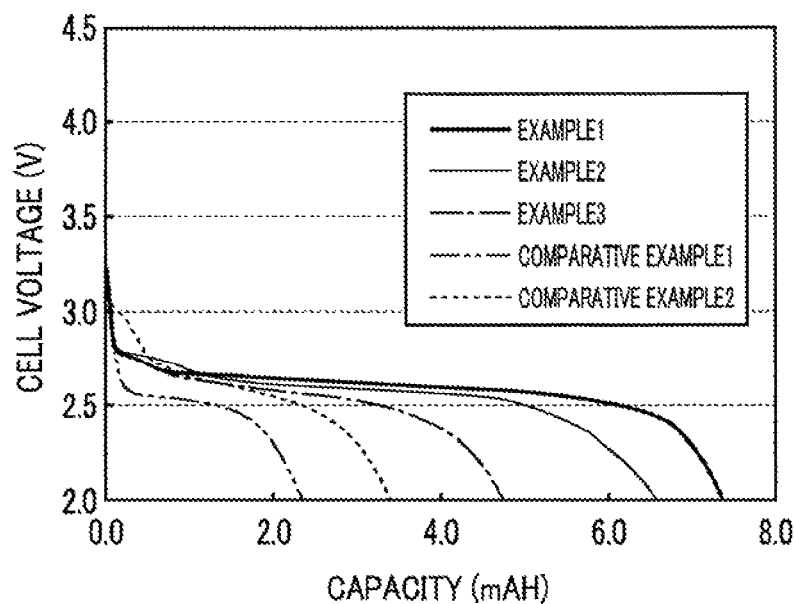
FIGS. 4(a) and 4(b) are graphs showing charge and discharge curves, respectively, for metal oxygen batteries of Examples according to the present invention, and comparative Examples.
Figure 4:
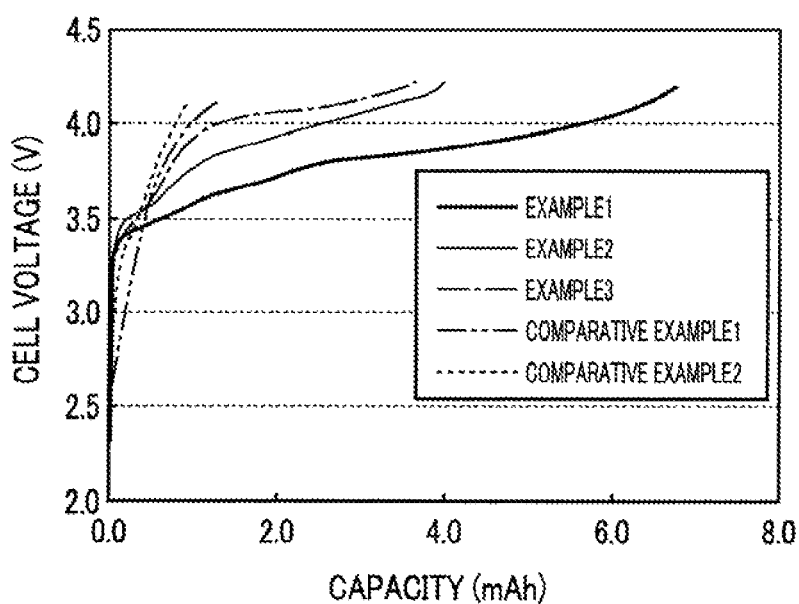

Then, the metal oxygen battery 1 obtained in the present Example was loaded on an electrochemical measuring apparatus (made by Toho Technical Research Co., Ltd.); and a current of 0.2 mA/cm² was applied between the negative electrode 3 and the positive electrode 2, and discharge was carried out until the cell voltage became 2.0 V. The relationship between the cell voltage and the discharge capacity at this time is shown in FIG. 4(a).

Then, the metal oxygen battery 1 obtained in the present Example was loaded on the electrochemical measuring apparatus; and a current of 0.2 mA/cm² was applied between the negative electrode 3 and the positive electrode 2, and the charge was carried out until the cell voltage became 4.2 V. The relationship between the cell voltage and the charge capacity at this time is shown in FIG. 4(b).

EXAMPLE 2

In the present Example, a metal oxygen battery 1 was obtained wholly as in Example 1, except for adding zirconium nitrate pentahydrate so as to become 5% by mass of the total amount of the primarily calcined material.

Then, the average particle diameter D50 of the composite metal oxide obtained in the present Example was calculated wholly as in Example 1, and a result thereof in the similar degree as in Example 1 was acquired.

The specific surface area of the composite metal oxide obtained in the present Example was measured wholly as in Example 1. The result is shown in Table 1.

Then, the charge and the discharge were carried out wholly as in Example 1, except for using the metal oxygen battery 1 obtained in the present Example. The relationship between the cell voltage and the discharge capacity at this time is shown in FIG. 4(a), and the relationship between the cell voltage and the charge capacity at this time is shown in FIG. 4(b).

EXAMPLE 3

In the present Example, a metal oxygen battery 1 was obtained wholly as in

Example 1, except for adding zirconium nitrate pentahydrate so as to become 1% by mass of the total amount of the primarily calcined material.

Then, the average particle diameter D50 of the composite metal oxide obtained in the present Example was calculated wholly as in Example 1, and a result thereof in the similar degree as in Example 1 was acquired.

The specific surface area of the composite metal oxide obtained in the present Example was measured wholly as in Example 1. The result is shown in Table 1.

Then, the charge and the discharge were carried out wholly as in Example 1, except for using the metal oxygen battery 1 obtained in the present Example. The relationship between the cell voltage and the discharge capacity at this time is shown in FIG. 4(a), and the relationship between the cell voltage and the charge capacity at this time is shown in FIG. 4(b).

COMPARATIVE EXAMPLE 1

In the present Comparative Example, a metal oxygen battery 1 was obtained wholly as in Example 1, except for using no zirconium nitrate pentahydrate at all.

Then, the average particle diameter D50 of the composite metal oxide obtained in the present Comparative Example was calculated wholly as in Example 1. The result is shown in Table 1. A graph of the particle size distribution of the composite metal oxide obtained in the present Comparative Example is shown in FIG. 2(b).

The specific surface area of the composite metal oxide obtained in the present Comparative Example was measured wholly as in Example 1. The result is shown in Table 1.

The amount of oxygen adsorbed of the composite metal oxide obtained in the present Comparative Example was calculated wholly as in Example 1. The result is shown as an oxygen release capability in FIG. 3.

Then, the charge and the discharge were carried out wholly as in Example 1, except for using the metal oxygen battery 1 obtained in the present Comparative Example. The relationship between the cell voltage and the discharge capacity at this time is shown in FIG. 4(a), and the relationship between the cell voltage and the charge capacity at this time is shown in FIG. 4(b).

COMPARATIVE EXAMPLE 2

In the present Comparative Example, a metal oxygen battery 1 was obtained wholly as in Example 1, except for adding zirconium nitrate pentahydrate so as to become 30% by mass of the total amount of the primarily calcined material.

Then, the specific surface area of the composite metal oxide obtained in the present Comparative Example was measured wholly as in Example 1. The result is shown in Table 1.

Then, the charge and the discharge were carried out wholly as in Example 1, except for using the metal oxygen battery 1 obtained in the present Comparative Example. The relationship between the cell voltage and the discharge capacity at this time is shown in FIG. 4(a), and the relationship between the cell voltage and the charge capacity at this time is shown in FIG. 4(b).

TABLE 1

|  | Average Particle Diameter D50 (μm) | Specific Surface Area (cm²/g) |
|---|---|---|
| Example 1 | 4.12 | 24.8 |
| Example 2 |  | 23.3 |
| Example 3 |  | 12.9 |
| Comparative Example 1 | 7.77 | 10.5 |
| Comparative Example 2 |  | 9.98 |

Figure 2:
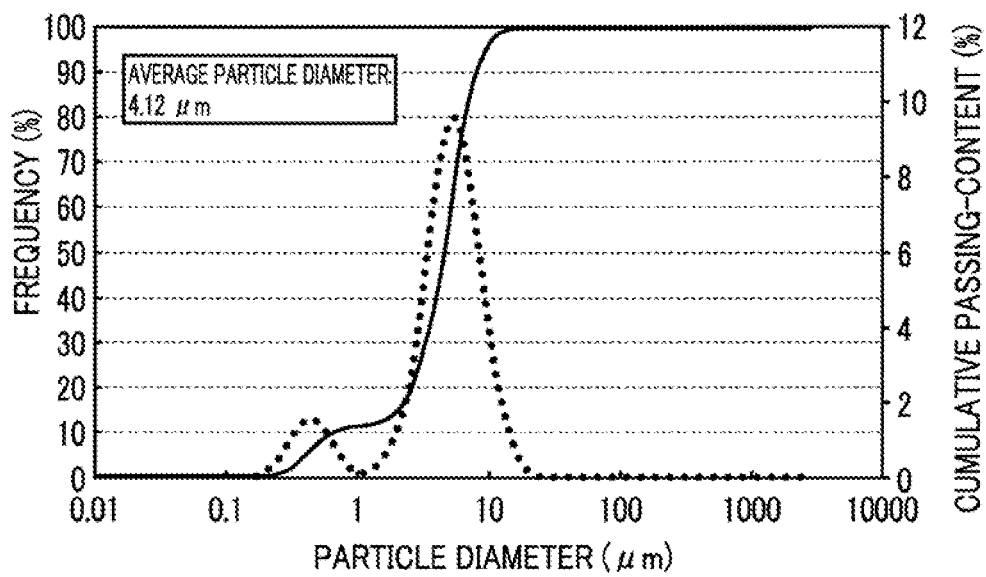
FIGS. 2(a) and 2(b) are graphs showing particle size distributions of the oxygen-storing materials according to the present invention and a comparative Example.
Figure 2:
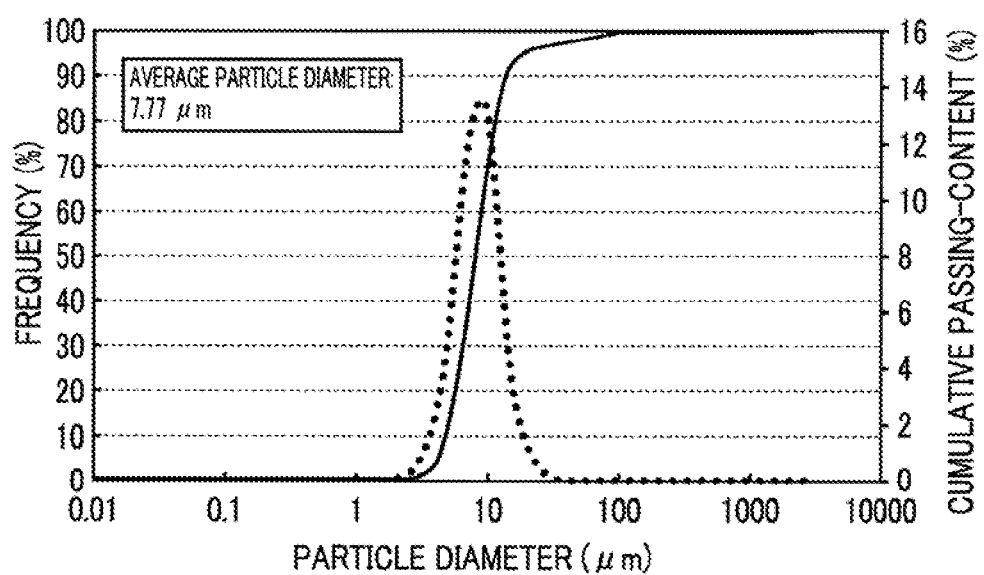

It is clear from Table 1 and FIG. 2 that the composite metal oxide obtained in Example 1 and containing $YMnO_3$ and $ZrO_2$ had a lower value of an average particle diameter D50 than the composite metal oxide obtained in Comparative Example 1 and composed only of $YMnO_3$. It is also clear from Table 1 and FIG. 2 that the composite metal oxides obtained in Examples 1 to 3 and containing $YMnO_3$ and $ZrO_2$ had larger specific surface areas than the composite metal oxide obtained in Comparative Example 1 and composed only of $YMnO_3$ or the composite metal oxide obtained in Comparative Example 2 by adding zirconium nitrate pentahydrate so as to become 30% by mass of the total amount of the primarily calcined material and containing $YMnO_3$ and $ZrO_2$.

Figure 3:
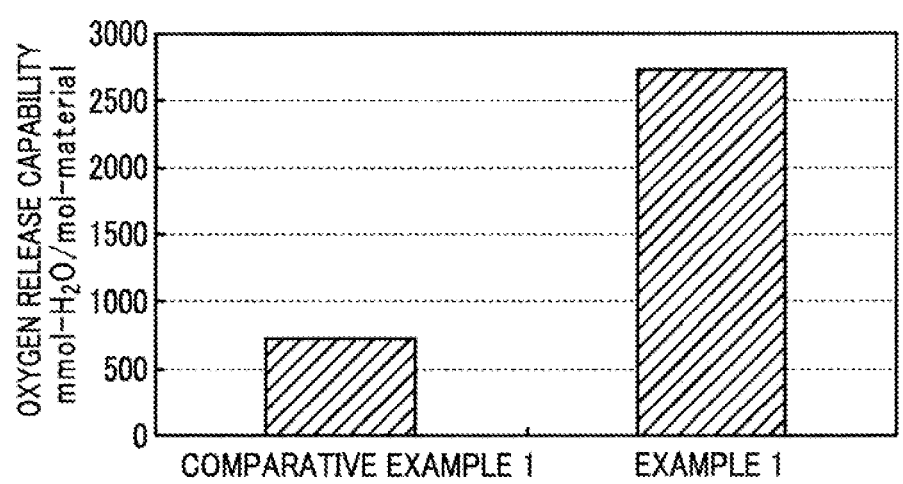
FIG. 3 is a graph showing an oxygen release capability of the oxygen-storing material according to the present invention.

It is also clear from FIG. 3 that the composite metal oxide obtained in Example 1 and containing $YMnO_3$ and $ZrO_2$ had a 3.5 or more times higher oxygen release capability than the composite metal oxide obtained in Comparative Example 1 and composed only of $YMnO_3$.

Then, it is clear from FIG. 4(a) that the metal oxygen batteries 1 of Examples 1 to 3 using the oxygen-storing materials comprising the composite metal oxide materials containing $YMnO_3$ and $ZrO_2$ exhibited lower discharge overpotentials than the metal oxygen battery 1 of Comparative Example 1 using the composite metal oxide composed only of $YMnO_3$, or the metal oxygen battery 1 of Comparative Example 2 using the composite metal oxide obtained by adding zirconium nitrate pentahydrate so as to become 30% by mass of the total amount of the primarily calcined material and containing $YMnO_3$ and $ZrO_2$.

It is also clear from FIG. 4(b) that the metal oxygen batteries 1 of Examples 1 to 3 using the oxygen-storing materials comprising the composite metal oxide materials containing $YMnO_3$ and $ZrO_2$ had larger discharge capacities and lower charge overpotentials than the metal oxygen battery 1 of Comparative Example 1 using the composite metal oxide composed only of $YMnO_3$, or the metal oxygen battery 1 of Comparative Example 2 using the composite metal oxide obtained by adding zirconium nitrate pentahydrate so as to become 30% by mass of the total amount of the primarily calcined material and containing $YMnO_3$ and $ZrO_2$.

What is claimed is:

1. A metal oxygen battery, comprising:
    a positive electrode to which oxygen is applied as an active substance;
    a negative electrode to which metallic lithium is applied as an active substance; and
    an electrolyte layer interposed between the positive electrode and the negative electrode,
    wherein the positive electrode, the negative electrode and the electrolyte layer are disposed in a hermetically sealed case, and
    wherein the positive electrode comprises, as an oxygen-storing material, a composite metal oxide obtained by crushing and mixing a yttrium salt, a manganese salt and an organic acid to obtain a mixture, primarily calcining the mixture to obtain a primarily calcined material, and thereafter, adding a zirconium salt to the obtained primarily calcined material in an amount in a range of 1 to 20% by mass of the total amount of the primarily calcined material, and secondarily calcining the mixture, the composite metal oxide comprising $YMnO_3$ and $ZrO_2$, and a part of the surface of the $YMnO_3$ particle is covered with the $ZrO_2$ particles.

2. The metal oxygen battery according to claim 1, wherein the yttrium salt comprises a nitrate salt of yttrium.

3. The metal oxygen battery according to claim 1, wherein the manganese salt comprises a nitrate salt of manganese.

4. The metal oxygen battery according to claim 1, wherein the zirconium salt comprises a nitrate salt of zirconium.

5. The metal oxygen battery according to claim 1, wherein the organic acid comprises malic acid.

* * * * *